United States Patent [19]

Groch et al.

[11] Patent Number: 4,466,075
[45] Date of Patent: Aug. 14, 1984

[54] MOTION CORRECTION CIRCUITRY AND METHOD FOR A RADIATION IMAGING DEVICE

[75] Inventors: Mark W. Groch, Elk Grove Village; James T. Rhodes, Naperville, both of Ill.

[73] Assignee: Siemens Gammasonics, Inc., Des Plaines, Ill.

[21] Appl. No.: 324,090

[22] Filed: Nov. 23, 1981

[51] Int. Cl.³ .............................................. G01T 1/20
[52] U.S. Cl. .................................. 364/571; 364/414; 250/363 S; 250/369
[58] Field of Search ............... 364/571, 414, 415, 518, 364/521; 250/363 S, 369; 378/99

[56] References Cited

U.S. PATENT DOCUMENTS

| | | | |
|---|---|---|---|
| 3,011,057 | 11/1961 | Anger | 250/366 |
| 3,780,290 | 12/1973 | Hoffer | 250/369 |
| 3,950,648 | 4/1976 | Martone et al. | 250/369 |
| 3,984,689 | 10/1976 | Arseneau | 250/369 |
| 4,144,569 | 3/1979 | Wagner | 364/414 |
| 4,179,607 | 12/1979 | Lange et al. | 364/414 |
| 4,223,221 | 9/1980 | Gambini et al. | 250/363 S |
| 4,223,388 | 9/1980 | Nishikawa et al. | 364/571 |
| 4,298,944 | 11/1981 | Stoub et al. | 250/363 S |
| 4,316,257 | 2/1982 | Del Medico et al. | 364/571 |
| 4,323,977 | 4/1982 | Arseneau | 364/571 |

OTHER PUBLICATIONS

"A Method Using a Digital Computer for Reducing Respiratory Artifact on Liver Scans Made with a Camera," by Oppenheim, J. Nucl. Med., vol. 12, pp. 625–628 (1971).

"Improved Means of Correcting Blurring in Scintographic Images," by McKeighen, Phys. Med. Biol., vol. 2, No. 2, pp. 353–362 (1979).

Primary Examiner—Gary Chin
Attorney, Agent, or Firm—Karl F. Milde, Jr.

[57] ABSTRACT

A motion correction method and related analog motion correction circuitry are disclosed, which correct for image blurring due to patient movement in scintigram heart studies using an Anger camera. X, Y positional coordinate signals developed for incident quanta of radiation E1 emitted by an isotope of energy 1 distributed in the heart are displayed on a CRT screen after correction in accordance with the displacement from an initial position $\bar{X}_o'$, $\bar{Y}_o'$ of a centroid calculated from X', Y' positional coordinate signals developed for incident quanta of radiation E2 emitted by isotope of energy 2 in the form of a point source strapped to the patient's chest for movement therewith.

12 Claims, 12 Drawing Figures

MOTION CORRECTION CIRCUITRY AND METHOD FOR A RADIATION IMAGING DEVICE

BACKGROUND OF THE INVENTION

1. Field of the Invention

This invention relates to motion correction for a radiation imaging device, such as a scintillation camera, to overcome image blurring due to movement of the object under study.

2. Description of the Prior Art

Radiation imaging devices are widely used as diagnostic tools for analyzing the distribution of a radiation-emitting substance in an object under study, such as in the medical diagnosis of a human body organ.

A typical radiation imaging device of a type to which the present invention is applicable is an Anger-type scintillation camera, the basic principles of which are described in U.S. Pat. No. 3,011,057. In such a device, quanta of radiation emitted by the object under study impinge upon a transducer in the form of a scintillation crystal to cause scintillation events. The events are detected by photodetectors arranged behind the transducer and analyzed to develop event X, Y positional coordinate signals representative of the relative spatial origins of the various quanta. The energies of the events are also analyzed to develop unblanking signals, so that only those events within a specified energy range of interest will be recorded for imaging, such as by display on a cathode ray tube oscilloscope. The mechanism for developing positional signals and unblanking signals for radiation imaging devices is well known and is described, for example, in U.S. Pat. No. 3,984,689.

The usefulness of a radiation imaging device as a diagnostic tool depends on the ability of the device to faithfully reproduce the distribution in the object under study of the radiation-emitting substance. One factor limiting this ability is the motion of the object, viz. the patient or body organ, during the diagnostic procedure. For imaging onto a CRT display, such motion produces undesirable blurring with consequential image deterioration. Use of a CRT display is common in medical diagnoses, such as liver scans, heart studies and the like.

Attempts to reduce the effects of patient movement during radiation imaging procedures have included the use of physical restraints to keep the patient still. Such devices are of limited value, cause patient discomfort and limit the types of tests that can be performed.

A more acceptable approach to motion correction for radiation imaging devices is the use of compensating circuitry which normalizes the positional signals developed from the detected radiation events in order to overcome the effects of object motion. Previously proposed motion correction methods of this type utilize the positional signals developed for display of events within the desired energy range, to calculate the mean or centroid position of the object under study. The positional signals are then corrected for object motion in accordance with the monitored displacement of the calculated object centroid.

A motion correction scheme using a digital computer on liver scans to correct for blurring due to patient breathing is described in Oppenheim, "A Method Using a Digital Computer for Reducing Respiratory Artifact on Liver Scans Made with a Camera," *J. Nucl. Med.*, Vol. 12, pages 625–628 (1971). A computer memory was used to store event data in matrix form. The median row of the data matrix was determined for each 0.6 second data collection interval. Each matrix was then shifted so that all image frames had their median rows at the same location. The various shifted data frames were then summed, producing a resultant image for which the blurring effects of the shifting object median position were minimized. This procedure was relatively expensive, complex and required increased processing time.

A more convenient and less expensive method of motion correction was proposed by Hoffer, which used simple analog circuitry, as described in U.S. Pat. No. 3,780,290. A schematic of the Hoffer circuit is shown in the prior art FIG. 1 for the correction of the X positional coordinate signal. Duplicate circuitry is employed for correction of the Y positional coordinate signal.

Figure 1:
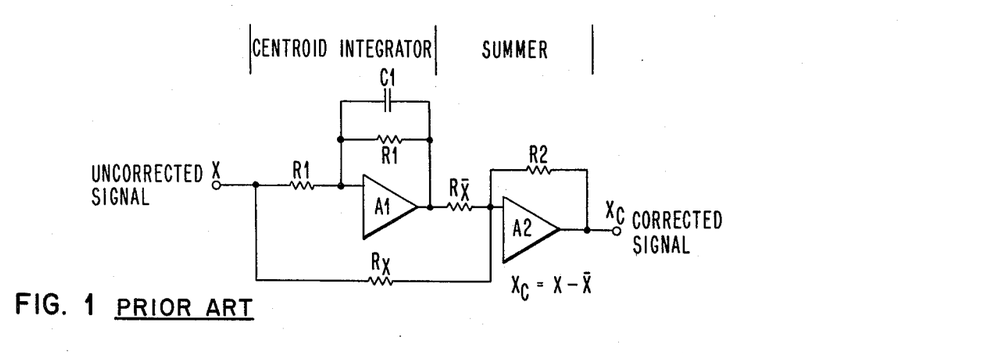
FIG. 1 (prior art) is a schematic diagram of a prior art motion correction circuitry.

With reference to prior art FIG. 1, incoming X positional coordinate signals are fed into an integrator comprising an operational amplifier A1, a capacitor C1 and two resistors R1, as shown. The magnitude of the signal determines the coordinate position of the corresponding radiation event along an X-axis direction. Signals with positive values, corresponding to events occurring on the $+X$ side of the X-axis, serve to charge the integrating capacitor C1; signals with negative values, corresponding to events occurring on the $-X$ side, serve to charge the integrating capacitor C1 with the opposite polarity. The voltage on the integrating capacitor C1 at any given time is the mean or centroid position $\overline{X}$ of the preceding distribution of events sampled by the integrator. A summer comprising an operational amplifier A2 and resistors $R_X$, $R_{\overline{X}}$ and R2, serves to normalize each succeeding positional signal by subtracting the calculated centroid position from the positional coordinate signal of each event to be displayed. For example, if the calculated centroid moves from a position $X=0$ to $X=2$, the value $X=2$ will be subtracted from the positional coordinate signals of the displayed events, resulting in a displayed image that is stationary on the viewing monitor, unblurred by the motion. This approach offers advantages over the digital approach in that it does not add to the image time or decrease the accumulated count rate.

Improved analog correction circuitry is described in McKeighen, "Improved Means of Correcting Blurring in Scintigraphic Images," *Phys. Med. Biol.*, Vol. 2, No. 2, pages 353–362 (1979). Such circuitry is shown in prior art FIG. 2. As in the Hoffer circuitry (prior art FIG. 1), the displacement of the centroid position of the radiation distribution of detected events is used to normalize the positional signals of the successive events. The centroid integrator, comprising the amplifier A1, the capacitor C1 and the resistors R1, is modified to include a switch SW1 which is closed in response to a strobe signal. The strobe signal corresponds to the unblanking signal developed by event energy analyzer circuitry and causes the switch SW1 to close whenever an event has been detected which is within the specified energy range of events to be displayed. The centroid integrator of the circuitry in prior art FIG. 2 offers advantages over the centroid integrator circuitry of prior art FIG. 1. In Hoffer's circuit, each event charges the integrator until the next event comes in. Thus the pulse widths driving the integrator are variable from event to event and depend on the counting rate. Also, the circuit estimates the centroid based on the count rate. The circuitry of prior art FIG. 2, on the other hand, estimates the centroid on a fixed number of events, independent of count rate. Further, the feedback resistor R1 of the integrator of prior art FIG. 2 is only connected across the capacitor C1 during a pulse interval, which prevents the feedback resistor from bleeding the charge of the capacitor during intervals when pulses are not charging the integrator.

The circuitry of prior art FIG. 2 includes a second integrator for calculating and holding the initial position of the centroid. This "initial position hold" circuit comprises the amplifier A3, the integrating capacitor C3 and the resistors R3. A switch SW3 serves to gate positional signals to the integrating capacitor C3 for an initial constant time interval determined by front panel controls on the imaging device. The "initial position hold" circuit serves to sample the initial position of the object and hold it in its relative position on the display, regardless of subsequent motion. This offers an advantage over the Hoffer circuit of prior art FIG. 1 in which the centroid position is always taken to be X=0. The prior art circuitry of FIG. 2 also includes an input buffer comprising the amplifier A4 and the resistors R4.

The summer, comprising the amplifier A2 and resistors R2, $R_X$, $R_{\bar{X}}$ and $R_{\bar{X0}}$, adjusts the uncorrected positional signal by subtracting from it the displacement of the centroid from its initial position: $X_C = X - (\bar{X} - \bar{X0})$.

The described circuits all have the disadvantage that the centroid displacement developed for correcting the displayed positional signals is based on the positional distribution of the displayed signals themselves. The use of centroids for motion correction which are based on emanations from the organ under study itself is undesirable because the centroids are influenced by factors which may be uncorrectable. An example of this is in the use of motion centroids to correct the patient motion in heart studies. Here the centroid is influenced by motion from respiration and intrinsic cardiac contraction, both of which adversely influence the correction. Twisting and turning of the heart itself (i.e. motion of the heart in a Z-axis direction) interferes with the calculation of the centroid of the distribution in the X-Y plane. The addition of respiration monitoring an electrocardiograph (ECG) gating does not wholly compensate for such distorting factors.

SUMMARY OF THE INVENTION

It is an object of the present invention to provide improved motion correction circuitry and an improved motion correction method for a radiation imaging device.

In one aspect of the invention, a method for correcting motion blurring in the radiation imaging of a distribution in an object of a first radiation imaging substance includes the step of correcting positional coordinate signals developed for display of imaging events within a first energy range caused by the first substance, using centroid positional signals developed from positional coordinate signals of imaging events within a second energy range caused by a second radiation emitting substance.

In another aspect of the invention, circuitry for implementing the motion correction method of the invention includes a centroid computation circuit for processing the positional coordinate signals of imaging events within the second energy range in order to develop the centroid positional signals, and a correcting circuit to correct the positional coordinate signals of imaging events within the first energy range using the developed centroid positional signals.

In a preferred embodiment of the invention, discussed in further detail below, presented in the environment of heart studies performed using an Anger-type scintillation camera, positional coordinate signals of events caused by a radiation-emitting dye of energy 1 injected into a patient's bloodstream and passing through the heart are corrected using centroid positional signals calculated for events caused by a point source of energy 2 contained in a holder which is strapped to the patient's chest. A preferred embodiment of circuitry takes the form of an analog motion correction circuit including an input buffer, a gated centroid integrator, an initial centroid position hold circuit and a summer wherein the integrating capacitors of the centroid integrator and the initial position hold circuit are charged by events falling within an energy window corresponding to the point source of energy 2.

There have thus been outlined rather broadly the more important objects, features and advantages of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including such equivalent arrangements as do not depart from the spirit and scope of the invention.

BRIEF DESCRIPTION OF THE DRAWINGS

An embodiment of the circuitry of the invention has been chosen for purposes of illustration and description of both the circuitry and method of the invention, and is shown in the accompanying drawings forming a part of the specification, wherein:

FIG. 2 (prior art) is a schematic diagram of an improved version of the circuitry of FIG. 1;

FIG. 3 is a schematic diagram of an Anger-type scintillation camera used for medical diagnosis in accordance with the present invention;

Throughout the drawings, like reference numerals represent like elements.

DESCRIPTION OF THE PREFERRED EMBODIMENT

With reference to FIG. 3, an Anger-type scintillation camera 10, incorporating motion correction circuitry in accordance with the present invention, includes a detector head 12 for detecting the distribution in a body organ (such as the heart) of a patient 14 of a radiation-emitting dye which has been ingested previously (such as by injection into the bloodstream). Quanta of radiation emitted by the ingested dye cause scintillation events to occur in a crystal located within the detector head 12. The occurrence of the scintillation events in the crystal are monitored by an array of photomultiplier tubes, whose outputs are statistically analyzed and developed into X, Y positional coordinate signals and CRT unblanking signals. These signals are used to develop an image of the dye distribution on a CRT oscilloscope display 16 which is mounted on a display console 18 that is electrically connected to the detector head 12. The circuitry which analyzes the photomultiplier tube outputs includes a first energy window analyzer of conventional construction to develop the unblanking signals so that only events whose energy falls within a first specified energy range will be displayed.

A quantity of radiation emitting isotope having an energy different from the isotope ingested by the patient 14 is contained within a holder 20 (FIG. 3), which is strapped above the thorax on the patient's chest. The different energy isotope contained within the holder 20 serves as a point source of radioactive emissions. Because the point source is strapped to the patient's chest, patient movement can be monitored by monitoring corresponding movement of the point source. Quanta of radiation emitted from the point source strike the crystal of the camera 10, as do the quanta of radiation from the dye distributed in the heart. Events caused by the point source radiation are, however, not displayed. X, Y positional coordinate signals developed from the point source emissions are used to compute the position of the centroid of the point source. Point source events are identified by means of a second energy window analyzer of conventional construction included in the circuitry of camera 10, which develops gating signals for events whose energy falls within a second specified energy range corresponding to rays from the different energy isotope.

The details of the circuitry of the camera 10 used to develop X, Y positional coordinate signals, unblanking signals and energy window gating signals are well-known, being described for example in U.S. Pat. No. 3,984,689. The '689 patent describes the construction of conventional energy window analyzer circuits for developing gating signals corresponding to events having energies within discontinuous energy bands and usable for dual isotope measurement. Scintillation cameras employing such circuitry are readily available commercially.

Figure 4:
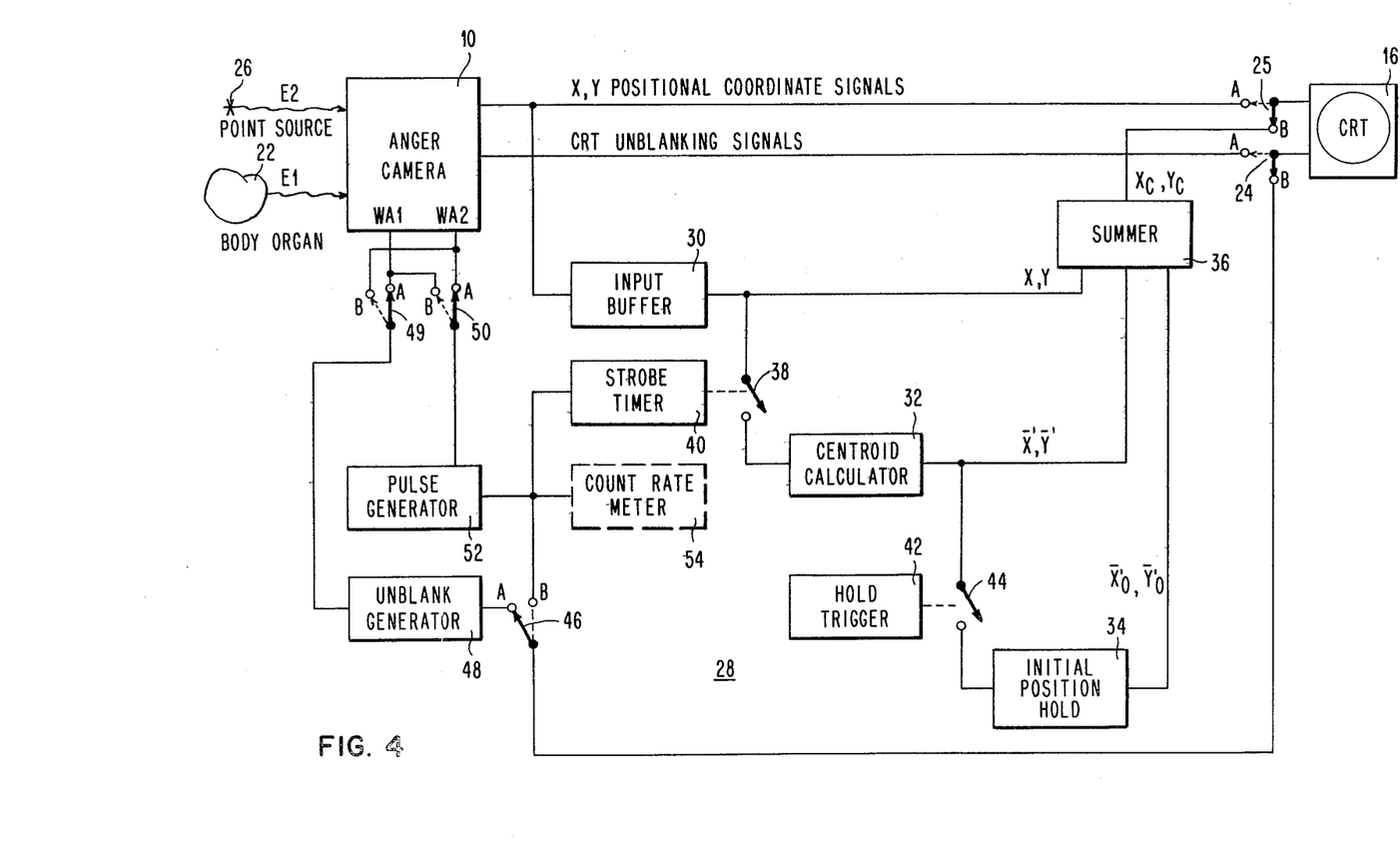
FIG. 4 is a block diagram of motion correction circuitry in accordance with the invention, shown in combination with other components of a radiation imaging device.

FIG. 4 shows the elements of a preferred embodiment of motion correction circuitry in accordance with the invention, with connections indicated to other circuitry of the Anger camera 10 and the CRT display device 16.

Quanta of radiation E1 emitted by an isotope (e.g. Tc-99m) of energy 1 distributed in the body organ 22 strike a transducer (i.e. a scintillation crystal behind which is arranged an array of photomultiplier tubes) within the camera 10, producing electrical pulses. Conventional position computation circuitry (not shown) within the camera 10 processes the pulses to develop event X, Y positional coordinate signals representative of the relative spatial origins of the incident radiation quanta. Analyzer circuitry, in the form of a first energy window analyzer WA1, develops first gating signals indicative that the energies of the quanta are within a first specified energy range. Other conventional circuitry included in the electronics of the camera 10 utilizes the first gating signals thus developed to form CRT unblanking signals in known ways. These X, Y positional coordinate signals and CRT unblanking signals correspond to the "horizontal", "vertical" and "CRT gate" signals developed by the circuitry described in U.S. Pat. No. 3,984,689 (see FIGS. 2A–2C of the '689 patent). The Anger camera 10 is connected to the CRT display 16 through the switches 24, 25 (see FIG. 4), so that when the switches 24, 25 are in the "A" positions, the X, Y positional coordinate signals will be displayed uncorrected by the CRT display 16. When the switches 24, 25, however, are in the "B" positions, positional coordinate signals and unblanking signals for control of the display 16 will be derived from the motion correction circuitry 28.

A radiation-emitting point source 26 of energy 2 (e.g. Am-241) (FIG. 4) contained within a holder 20 (FIG. 3) emits quanta of radiation E2 which are detected by the Anger camera 10. The same electronics of the camera 10 that develops X, Y positional coordinate signals for events caused by the quanta of radiation E1 from the body organ 22 also serves to develop X', Y' positional coordinate signals for events caused by the quanta of radiation E2 incident from the point source 26. Analyzer circuitry, in the form of a second energy window analyzer WA2, develops second gating signals for events within a second specified energy range that are caused by the quanta of radiation E2. The internal circuitry of the Anger camera 10 will normally be set so that, with the switches 24, 25 in the "A" positions, the CRT unblanking signals are derived from the first gating signals only, with the result that only the X, Y positional coordinate signals will be displayed. It will be appreciated by those skilled in the art, however, that the circuitry of the Anger camera 10 may also be set so that the CRT unblanking signals are derived from both the first and second gating signals if desired, so that both X, Y and X', Y' positional coordinate signals will cause events to be displayed on the CRT display 16. The point source 26 may, for example, be used to serve as an anatomical marker.

The motion correction apparatus 28, shown in block form in FIG. 4, comprises an input buffer 30, a centroid calculator 32, an initial position hold circuit 34 and a summer 36. Uncorrected positional coordinate signals developed by the circuitry of the Anger camera 10 are fed to the input buffer 30. A strobe switch 38, controlled by a strobe timer 40, connects the output of the input buffer 30 to the centroid calculator 32 for events of a selected energy range. The centroid calculator 32 computes the centroid position of these events based on the positional coordinate signals which pass from the input buffer 30 to the centroid calculator 32 when the switch 38 is closed.

The initial position hold circuit 34 calculates an initial centroid position and is controlled by a hold trigger 42 which operates to close switch 44.

The summer 36 functions to correct the event positional coordinate signals developed by the electronics of the Anger camera 10 in accordance with the centroid position computed by the centroid calculator 32 and the initial centroid position computed by the initial position hold circuit 34. When the switch 24 is in the "B" position and a switch 46 is in the "A" position, an unblank generator 48 provides unblanking signals for control of the CRT display device 16.

A pair of switches 49, 50 determines which of the first and second gating signals developed respectively by the first and second energy window analyzers WA1, WA2 will control the unblanking of the CRT display 16 and the strobe timer 40 which controls the switch 38 for directing positional coordinate signals to the centroid calculator 32. With switches 46, 49 and 50 in the "A"

positions (as shown by the solid lines in FIG. 4), corrected $X_C$, $Y_C$ positional coordinate signals for events having energies within the first specified energy range will be imaged on the CRT display 16; other events will not be recorded. In other words, for the switch positions shown, X, Y positional coordinate signals developed for quanta of radiation E1 emitted by the isotope of energy 1 distributed within the body organ 22 will be corrected to eliminate motion blurring, based upon centroid positional signals developed from the X', Y' positional coordinate signals of incident quanta of radiation E2 emitted by the point source 26 of the isotope of energy 2.

The other switch positions of switches 46, 49 and 50 provide options for different possible uses of the same circuitry. With the switch 46 in the same "A" position, but with the switches 49, 50 in the "B" positions, the second gate signals developed by the second window analyzer WA2 will be used to drive the unblanking generator 48 and the first gate signals developed by the energy window analyzer WA1 will be used to drive the strobe timer 40. In other words, with the switches 49, 50 in the "B" positions, the distribution of the point source 26 will be imaged on the screen of the CRT display 16, with X', Y' positional coordinate signals corrected in accordance with centroid movement compensation based upon radiation incident from the body organ 22. Gating signals are directed from the window analyzer selected by the switch 50 to the strobe timer 40 by means of an intermediate pulse generator circuit 52. If the switch 46 is set into the "B" position, unblanking signals for the CRT display 16 will be generated by the pulse generator 52. Consequently, positional coordinate signals for quanta of radiation E1 or E2 (depending upon the setting of switch 50) will be displayed after correction, based on centroid calculations for events of the same energy range as the displayed event. For example, with switches 46, 50 in the "B" positions, motion correction is provided for imaging the distribution of the isotope of energy 1 within the body organ 22 based on displacement of the centroid of the E1 quanta distribution. Since, for such a setting, correction is based on the same events that are being displayed (and not on the displacement of the centroid of a different isotope of energy 2, such as the point source 26), the advantages of the present invention will not be realized.

A count rate meter 54 (indicated in dashed lines in FIG. 4) is advantageously provided to give an indication of when the count rate is sufficient to permit computation.

Figures 5, 5A:
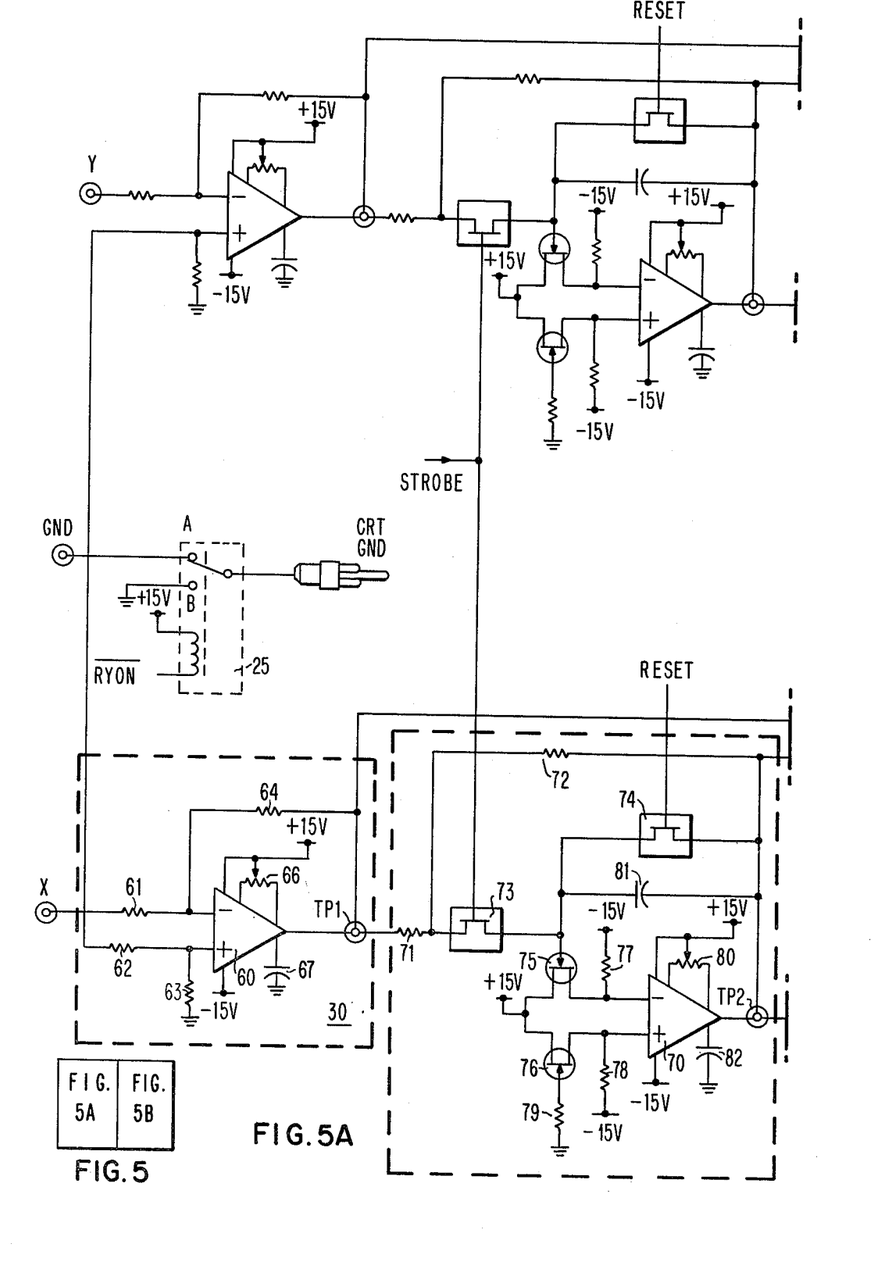
FIGS. 5 5A, 5B, 6, 6A, 6B, 6C and 6D are detailed circuit diagrams of the motion correction circuitry of FIG. 4.
Figure 5B:
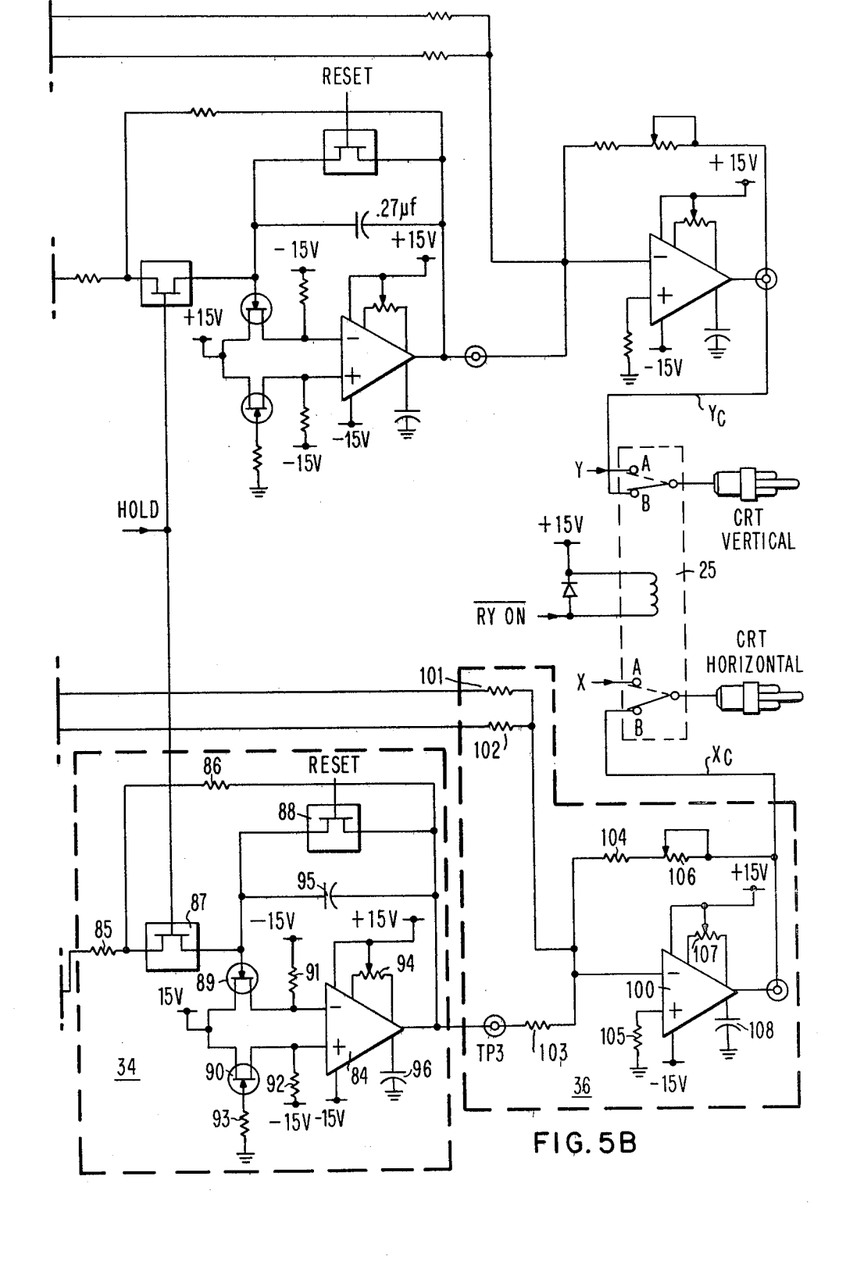
Figures 6, 6A:
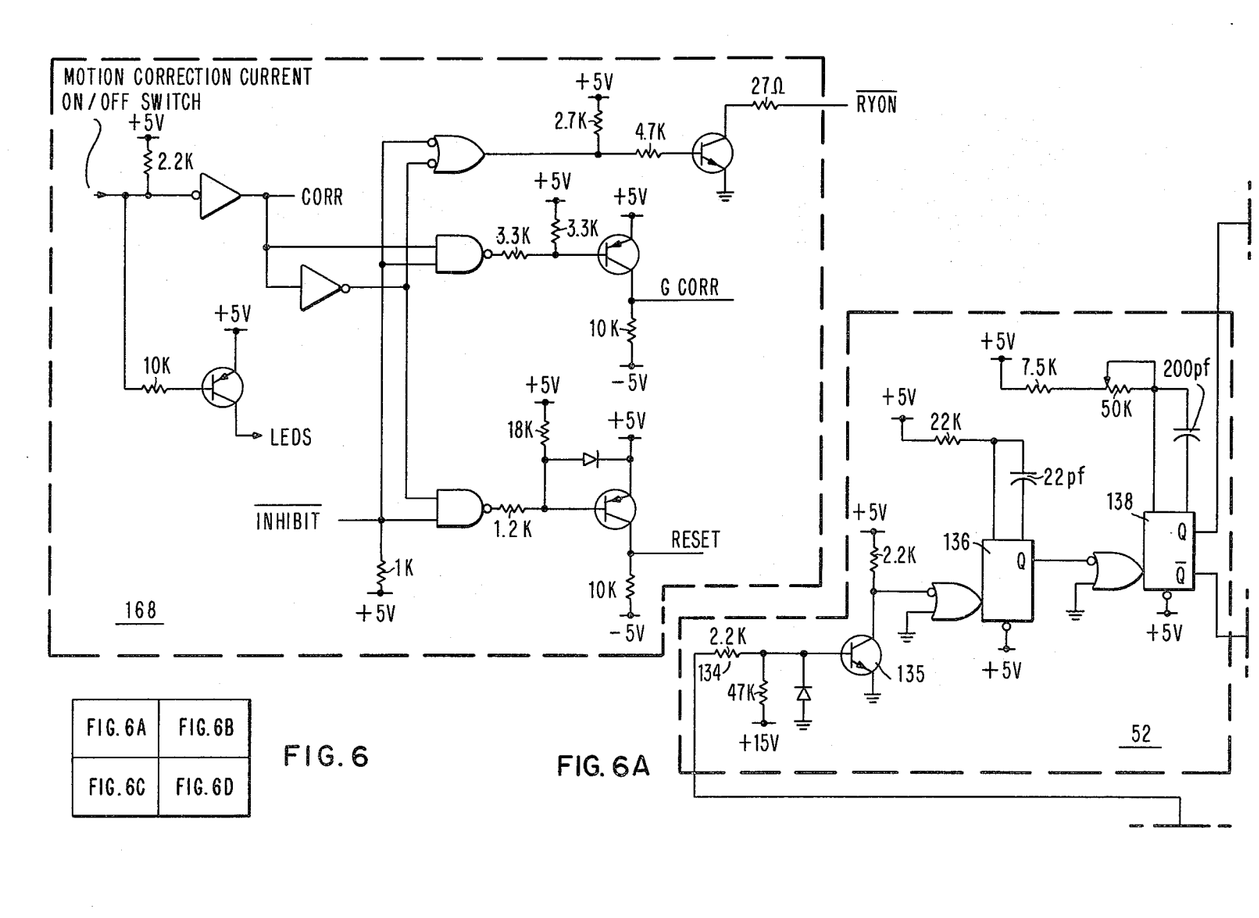
Figure 6B:
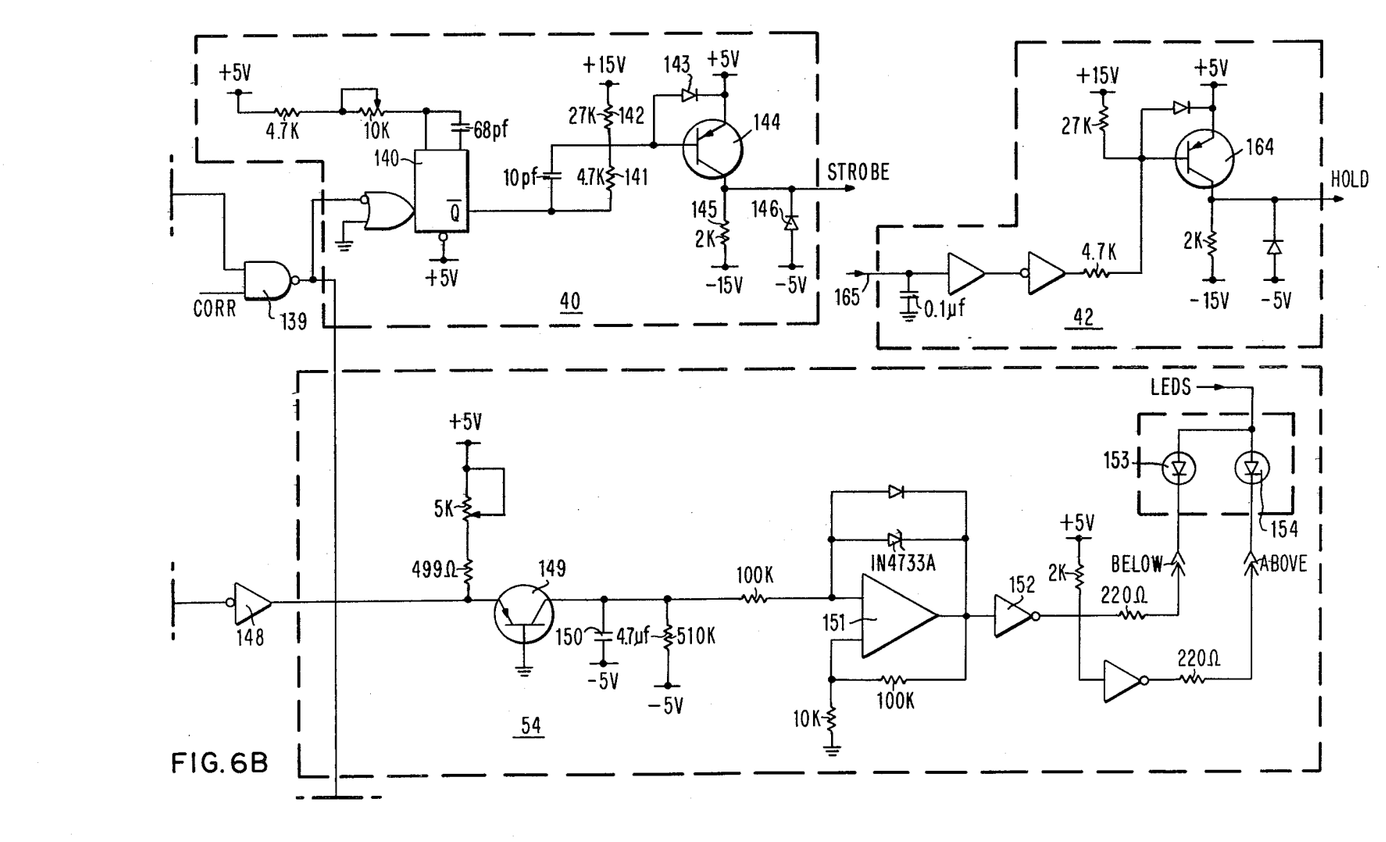
Figure 6C:
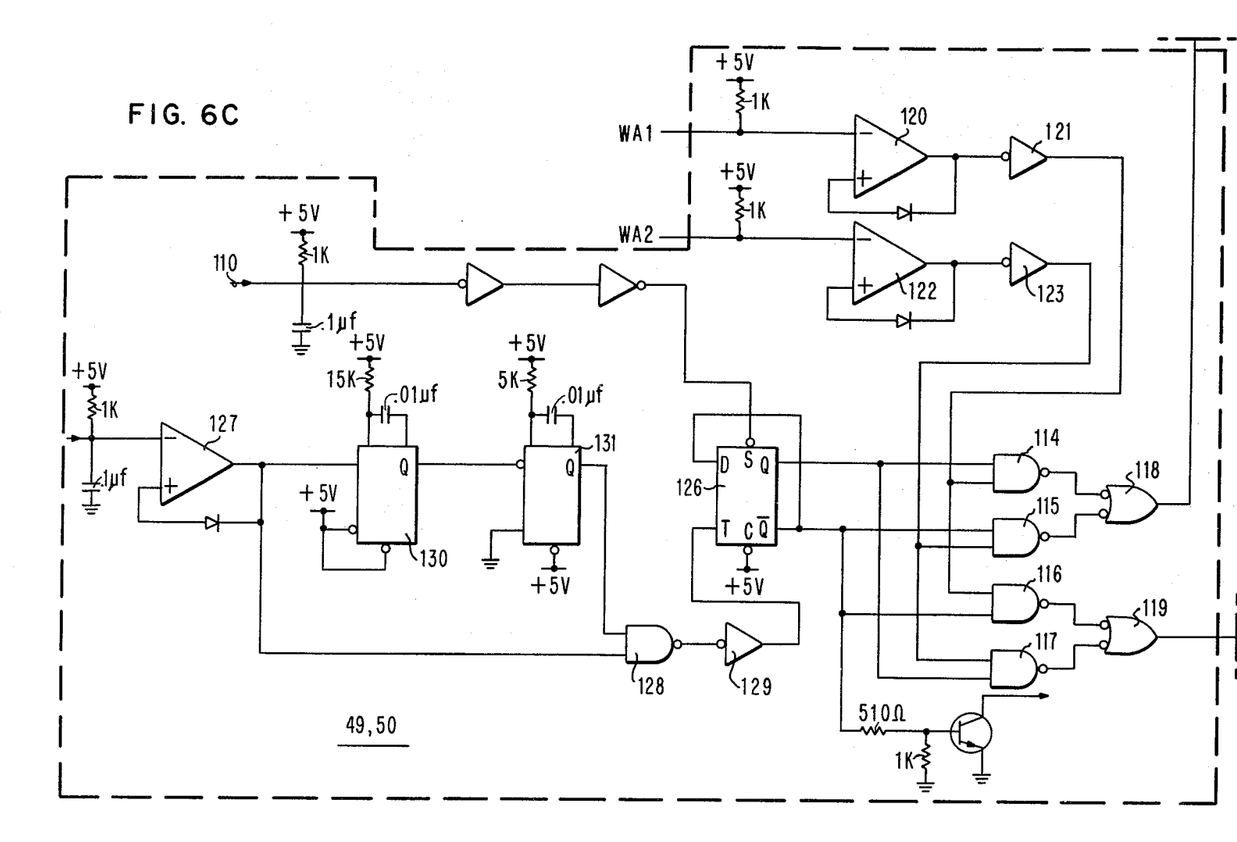
Figure 6D:
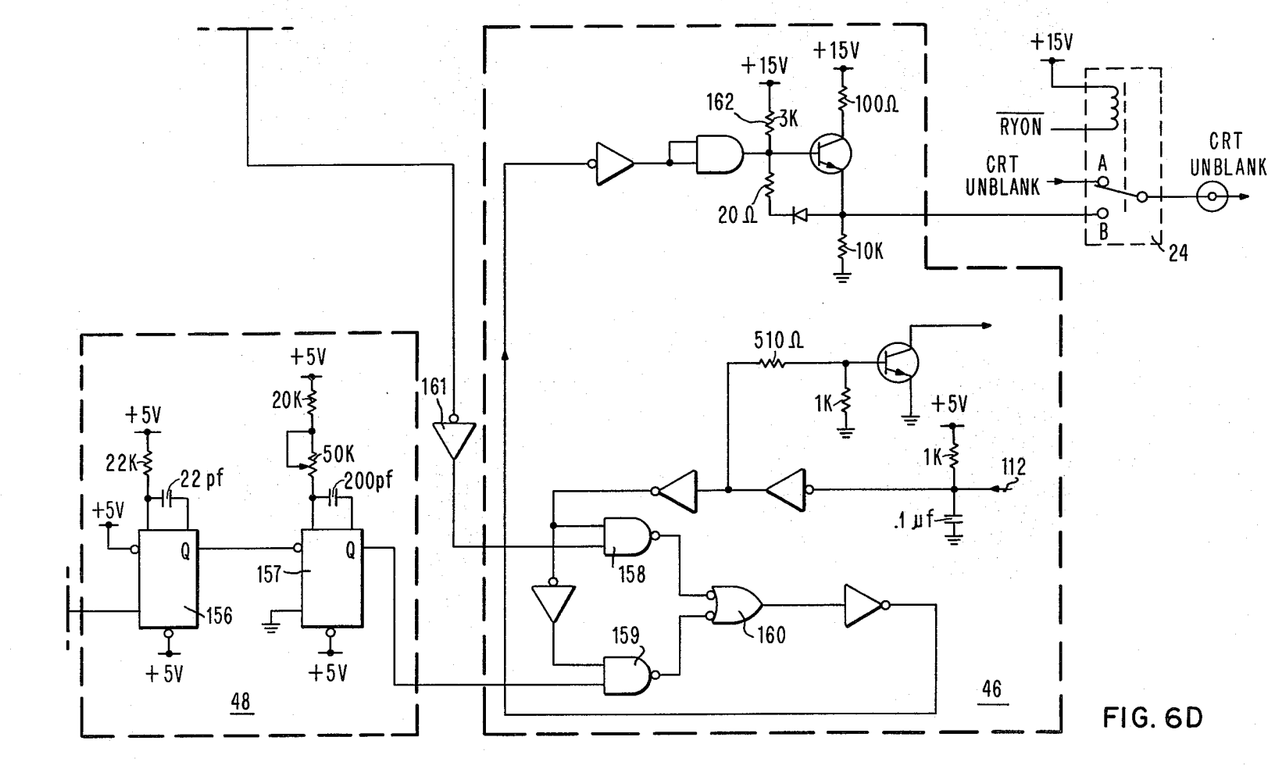

FIGS. 5 and 6 are detailed schematics showing the components of the circuit elements shown in block form in FIG. 4. FIG. 5 gives the details of the input buffer 30, the centroid calculator 32, the initial position hold circuit 34 and the summer 36. FIG. 6 gives the details of the control circuitry which comprises the strobe timer 40, the hold trigger 42, the unblank generator 48, the pulse generator 52 and the count rate meter 54.

The circuitry of FIG. 5 serves to correct the X, Y positional coordinate signals developed by the Anger camera 10 for the quanta of radiation E1 emanating from the body organ 22. The circuitry of FIG. 6 acts to control the circuitry of FIG. 5, and develops the strobe and hold signals which gate the inputs, respectively, to the centroid calculator 32 and the initial position hold circuit 34. These are three inputs from the Anger camera 10 to the circuitry of FIG. 5. These are the X positional coordinate signal, the Y positional coordinate signal and a ground ("GND") signal. When the switch 25 (FIGS. 4 and 5) is in the "A" position, these signals are passed directly through to the CRT vertical drive, CRT horizontal drive and CRT ground inputs. With the switch 25 in the "B" position, the positional signals are processed by the motion correction circuitry 28. With reference to FIG. 5, since the circuitry for processing the X positional coordinate signal is identical to the circuitry for processing the Y positional coordinate signal, to avoid repetition, only the circuitry relating to the processing of the X positional coordinate signal will be described.

For each radiation event detected by the Anger camera 10 (i.e. for incident quanta of radiation E1 or E2), an X (or X') positional coordinate signal is developed by the internal electronics of the camera 10. Each X positional coordinate signal is delivered as an input to the input buffer 30 (FIG. 5). The input buffer 30 takes the form of a differential operational amplifier comprising an HA2525 amplifier 60, 4.99 K-ohm resistors 61, 62, 63 and 64, a 20 K-ohm variable resistor 66 and a 20 pf capacitor 67, all connected as shown in FIG. 5. The resistor 62 is grounded through the GND connector at the signal source. The X position coordinate signal is applied to the amplifier 60 inverting input through the resistor 61. Feedback current for the operational loop is supplied by the resistor 64. The variable resistor 66 serves to remove error due to the amplifier input offset voltage. The capacitor 67 is selected to set frequency stability to prevent circuit oscillation.

The amplifier 60 and its associated components (61, 62, 63, 64, 66 and 67) are configured in the inverting mode and serve as a buffer amplifier. The output of the input buffer 30 at a point TP1 is a signal equal in magnitude but inverted in polarity to the input signal. That is, the output signal is $-X$. The output of the input buffer 30 is connected as an input to both the centroid calculator 32 and the summer 36.

The centroid calculator 32 consists of an HA2525 amplifier 70, 4.99 K-ohm resistors 71 and 72, CD4016 analog switches 73 and 74, field-effect transistors (FET's) 75 and 76, 60.4 K-ohm resistors 77 and 78, a 100-ohm resistor 79, a 20 K-ohm variable resistor 80, a 0.027 $\mu$f capacitor 81, and a 5 pf capacitor 82. The elements of the centroid calculator 32 are connected as shown in FIG. 5 in the configuration of an integrator.

The capacitor 81 will be charged for negative signals and discharged for positive signals appearing at point TP1 when the analog switch 73 is closed. The analog switch 73 is closed in response to strobe signals developed by the strobe timer 40. The strobe signal has a fixed time period (pulse width), as discussed below. Thus, the capacitor 81 charges for the same amount of time for each event of the selected energy range (i.e. as determined by WA2 for position "A" of switch 50). After a number of such events the value held by the capacitor 81 appearing at the output point TP2 at any given time, will be the mean or centroid of the distribution of the preceding positions of events of the selected energy range (i.e. determined by WA2). When the analog switch 73 is closed, the current through the resistor 71 is used to charge the capacitor 81. The FET 75, operated in the common drain mode, is inserted at the input of the amplifier 70 to minimize capacitor 75 leakage due to the bias current. The resistor 77 sets the operating point of the FET 75. The variable resistor 80 serves to eliminate errors caused by the amplifier 70 input offset voltage. The resistor 72 sets the loop gain at one. The FET 76 and the resistors 78 and 79 minimize errors due to the bias current. The analog switch 74 discharges the capacitor 81 in response to a reset signal generated when the motion correction circuit 28 is turned off.

The voltage (neglecting statistical noise) at the output of the centroid calculator 32 (point TP2) will follow the mean or centroid of the position distribution of events presented at its input TP1 when the switch 73 is closed (i.e. for events from the point source 26, FIG. 4). The signal at TP 2 is, however, inverted. The output of the centroid calculator 32 is connected as an input to both the initial position hold circuit 34 and the summer 36.

The initial position hold circuit 34 comprises an amplifier 84, 10 K-ohm resistors 85 and 86, CD4016 analog switches 87 and 88, FET's 89 and 90, 60.4 K-ohm resistors 91 and 92, a 100-ohm resistor 93, a 20 K-ohm variable resistor 94, a 0.27 μf capacitor 95 and a 10 pf capacitor 96. These elements of the circuit 34 are connected as shown in FIG. 5 to form a track-and-hold circuit configuration. During the track mode, the circuit 34 operates like an inverting unity gain amplifier. During the hold mode, the capacitor 95 will hold a charge equal to the absolute value of the input (point TP2) at the time the analog switch 87 is shut off. The voltage appearing at TP2 causes current to flow in the resistor 85 when the analog switch 87 is turned on.

Control of the switch 87 is performed by the hold trigger 42, discussed below. The FET 89, operated in the common drain mode, placed at the input of the amplifier 84 serves to minimize leakage of the capacitor 95 due to bias current. The resistor 91 sets the operating point of the FET 95. The FET 90 and the resistors 91 and 92 similarly serve to minimize error due to bias current. The analog switch 88 acts to discharge the capacitor 95 in response to a reset signal when the motion correction circuitry 28 is turned off. The resistor 86 sets the loop gain at one.

The hold trigger 42, discussed below, functions to hold the analog switch 87 in a gated "on" position (i.e. hold signal at a +5 volts level) for a short time period prior to initiation of the diagnostic procedure (about 10 seconds). When the study is begun, the hold signal is brought to a −5 volts level, which turns off the analog switch 87. The D.C. voltage level hold at this point on the capacitor 95 represents the initial mean or centroid position of the distribution of events (from the point source 26) at the time when the switch 87 was opened. This voltage appears at the output of the circuit 34 (point TP3) and is the inverted voltage that was present at point TP2 when the hold signal went negative. The output at TP3 is connected as an input to the summer 36.

The summer 36 is a summing amplifier comprising an HA2525 amplifier 100, 10 K-ohm resistors 101, 102 and 103, an 8.25 K-ohm resistor 104, a 2.5 K-ohm resistor 105, a 5 K-ohm variable resistor 106, a 20 K-ohm variable resistor 107, and a 20 pf capacitor 108. The summer 36 sums together the outputs of the input buffer 30, the centroid calculator 32 and the initial position hold circuit 34 which are connected as inputs to the amplifier 100 through the resistors 101, 102 and 103, respectively. Feedback current is provided by the serially connected resistors 104 and 106. The variable resistor 107 is adjusted to minimize errors caused by the input offset voltage of the amplifier 100. The capacitor 108 stabilizes the frequency response to prevent oscillation.

The construction of switches 49 and 50 (FIG. 4), which serve to select which of the first and second gating signals (developed respectively by the analyzers WA1 and WA2) will control the stobe timer 40 and which will control the unblank generator 48, is shown in FIG. 6. FIG. 6 also shows the construction of switch 46, which together with the other switches serves to provide either dual isotope or single isotope motion correction. Control of the switches 46, 49 and 50 is done by selectively either connecting the input terminals 110, 112 to ground (gives a logic "0") or leaving them open (logic "1"), and by applying a momentary ground to switch 111. Table 1, shows the connections necessary for the various modes of operation.

TABLE 1

| Operational Modes | | | | |
|---|---|---|---|---|
| | | Terminal Connections | | |
| Events to be Displayed | Events used for Correction | 110 | 111 (switched so that) | 112 |
| E1 | E2 | 1 | Q = 0 | 0 |
| E2 | E1 | 1 | Q = 1 | 0 |
| E1 | E1 | 0 | — | 1 |

Throughout the specification, except as otherwise stated, switches 46, 49 and 50 are considered to be all set in the "A" positions which causes the imaging on the CRT display 16 of events caused by the isotope of energy 1 distributed in the body organ 22 at CRT positions directed by X, Y positional coordinates, which have been corrected based on centroid positional information computed from events caused by the point source 26 of the isotope of energy 2.

The first and second gating signals developed by the window analyzer circuits WA1 and WA2, respectively, are directed to the pulse generator 52 and the unblank generator 48 by NAND-gates 114, 115, 116 and 117 and OR-gates 118 and 119, connected as shown in FIG. 6. The analyzer circuit WA1 delivers the first gating signals to the NAND-gates 114 and 116 through an 8820 line receiver 120 and an inverter 121. The analyzer circuit WA2 delivers the second gating signals to the NAND-gates 115 and 117 through an 8820 line receiver 122 and an inverter 123. Passage of the gating signals through the NAND-gates is controlled by connection of the second inputs of NAND-gates 114 and 117 to the noninverting Q terminal and the second inputs of NAND-gates 115 and 116 to the inverting $\bar{Q}$ terminal of a 7474 "D"-type flip-flop 126. The "S" (set) terminal of the flip-flop 126 is connected as shown to receive signals from the terminal 110. When terminal 110 is "0" (i.e. grounded), the flip-flop 126 will be set with the Q output="1" and the $\bar{Q}$ output="0". This routes WA1 signals to the pulse generator 52. When terminal 110 is "1" (i.e. open), the forced set signal is removed from the flip-flop 126. In this case, the flip-flop 126 is controlled by the signal at the terminal 111 which is connected through an 8820 line receiver 127, a NAND-gate 128 and an inverter 129 to the "T" pin of the flip-flop 126. Two 9602 monostable one-shot multivibrators 130 and 131 connected between the line receiver 127 and the NAND-gate 128 serve as a delay to prevent noise at terminal 111 from switching the flip-flop 126. Each time the terminal 111 is "0" (i.e. grounded), the Q state of flip-flop 126 will be altered. If Q=1, WA1 pulses are routed to the pulse generator 52 and WA2 pulses are routed to the unblank generator 48. If Q=0, WA2 pulses are routed to the pulse generator 52 and WA1 pulses are routed to the unblank generator 48. Once set to any state, the flip-flop 126 will not switch state until either terminal 110 or 111 is grounded.

The output of the NAND-gate 118 is connected to deliver pulses from the selected analyzer circuit WA1 or WA2 through resistor 134 to the base of a transistor 135 of the pulse generator 52. Positive pulses received at the base turn on the transistor 135 and trigger a 9602 delay monostable circuit 136. This provides a short delay (less than 500 μsecs.) during which the positional coordinate signals can be delivered to the input buffer 30 for the corresponding event (see FIG. 4). The trailing edge of the delay pulse is used to trigger a second 9602 monostable circuit 138 which generates a pulse of about 3 μsecs. duration. This pulse is directed to the strobe timer 40, the count rate meter 54 and the switch 46.

The noninverted Q output of the monostable 138 of the pulse generator 52 is connected through a NAND-gate 139 to the input of a 9602 monostable circuit 140 of the strobe timer 40. The monostable 140 generates pulses used to turn on the analog switch 73 (FIG. 5) which permits the integrating capacitor 81 of the centroid calculator 32 to charge. A level shifter, comprising the elements 142–146 shown in FIG. 6, serves to convert the TTL level output of the monostable 140 to a strobe signal pulse that swings between +5 and −5 volts which controls the analog switch 73. When the transistor 144 is turned on, its collector is positive, turning on the switch 73.

The inverted Q output signal of the monostable 138 of the pulse generator 52 is routed to the count rate meter 54 by the inverter 148. When the inverter 148 goes positive during each pulse, a transistor 149 turns "on" thereby charging a capacitor 150. At low count rates, the charge on the capacitor 150 is insufficient to switch a connected 741 comparator 151. The high level at the output of the comparator 151 is inverted by an open collector inverter 152 which serves to turn on a "Below" LED 153 indicating a low count. When the count rate reaches a specified number (approx. 2300 counts per second) the comparator 151 switches state, thereby turning "on" an "Above" LED 154.

The output of the OR-gate 119 is connected to deliver gating signals from the analyzer circuit WA1 or WA2, as selected by the switches 49, 50 (FIG. 6), to trigger a 9602 delay monostable circuit 156 of the unblank generator 48 (FIG. 2). The output of the 9602 monostable 156 serves to trigger another 9602 monostable 157 which develops unblank pulses to unblank the display 16 in accordance with the selected gating signals.

The switch 46 (FIG. 4) comprises NAND-gates 158, 159, connected to deliver inverted inputs to an OR-gate 160 as shown in FIG. 6. The noninverted Q output of the monostable circuit 138 is connected through an inverter 161 as an input to the NAND-gate 158. The noninverted unblank pulse output of the monostable 157 of the unblank generator 48 is connected as an input to the NAND-gate 159. The terminal 112 is connected to control which of the NAND-gates 158 or 159 will deliver unblanking pulses to the "B" terminal of the switch 24 (FIGS. 4 and 6) via an unblank emitter follower circuit 162. When the terminal 112 is connected to be logic state "0" (i.e. grounded, corresponding to position "A" of the switch 46), the NAND-gate 159 is active to deliver unblanking pulses from the unblank generator 48 to the "B" terminal of the switch 24. When the terminal 112 is "1" (i.e. open, corresponding to the "A" position of the switch 46), the NAND-gate 158 is active to deliver unblanking signals as developed by the pulse generator 52. In the latter case, the events displayed on the display 16 will also be used for correction.

The hold trigger circuit 42 comprises the transistor 164 and associated components shown in FIG. 6. When a diagnostic procedure is begun, a signal delivered to the terminal 165 of the circuit 42 will cause the analog switch 87 of the initial position hold circuit 34 to turn off. The details of the circuitry for developing reset (RESET) signals to reset the analog switches 74 and 88 (FIG. 5), relay signals ($\overline{\text{RYON}}$) to control the settings of the switches 24 and 25 (FIGS. 4, 5 and 6) and signals for activating the NAND-gate 139 and the LED's 153 and 154 (FIG. 6) is shown in the form of on/off circuitry 168 in FIG. 6.

In operation, with switches 46, 49 and 50 in the "A" positions and the switches 24 and 25 in the "B" positions, the motion correction circuitry 28 (FIG. 4) will correct positional coordinate signals developed for display by the camera 10 for quanta of radiation E1 incident from the body organ 22, in accordance with the changes in position of a centroid calculated from the positional coordinate signals developed for quanta of radiation E2 incident from a point source 26.

The summer 36 computes corrected $X_c$, $Y_c$ positional coordinate signals for events from the body organ 22 from X, Y positional coordinate signals delivered to the input buffer 30; $\overline{X}'$, $\overline{Y}'$ centroid position signals representing the mean of X', Y' positional coordinate signals for events from the point source 26; and $\overline{X}_0'$, $\overline{Y}_0'$ initial centroid position signals representing the initial position of the centroid of events from the point source 26. The unblanking generator 48 develops unblanking signals for events from the body organ 22 so that the CRT display 16 is synchronously unblanked to display the corrected positional coordinate signals for events from the body organ 22. Since correction is based on radiation events other than those used to determine the distribution of the radiation-emitting substance in the body organ, through appropriate selection of a second radiation source for the centroid calculations, the correction process can be made relatively free from distortion due to uncorrectable movement of the body organ normal to the imaging plane. The choice of isotopes of energy 1 and energy 2 used is largely a matter of personal preference. Using the higher energy isotope in the body organ and the lower energy isotope in the point source, rather than the other way around, will prevent secondary emissions (at lower energies) from the higher energy isotope from being received by the camera as valid body organ isotope distribution data.

Having thus described the apparatus and method of the invention with particular reference to an example embodiment, it will be obvious to those skilled in the art to which the invention pertains, after understanding the invention, that various changes and modifications may be made therein without departing from the spirit and scope of the invention as defined by the claims appended hereto.

What is claimed is:

1. Motion correction circuitry for correcting the motion due to patient's movement in a radiation imaging device, comprising:
   (a) a transducer for producing electrical pulses in response to quanta of radiation impinging on the transducer derived from a first radiation substance associated with the patient's body having energies within a first specified energy range, and a second radiation substance associated with the patient's body having energies within a second specified energy range;

(b) circuitry for processing the electrical transducer pulses to develop (b1) first positional coordinate signals corresponding to quanta of radiation having energies within the first specified range; and (b2) second positional coordinate signals corresponding to the quanta of radiation having energies within the second specified range;

(c) circuitry for processing the second positional coordinate signals to develop centroid positional coordinate signals corresponding to the mean position of a plurality of the second positional coordinate signals; and (d) circuitry for processing the centroid positional coordinate signals for correcting the first positional coordinate signals.

2. Motion correction circuitry as defined in claim 1, wherein the circuitry for processing the centroid positional coordinate signals for correcting the first positional coordinate signals comprises a summer which is connected to sum the first positional coordinate signals and the centroid positional coordinate signals.

3. Motion correction circuitry as defined in claim 1, for a radiation imaging device further having analyzer circuitry connected for processing the electrical transducer pulses to develop first gating signals for electrical transducer pulses caused by radiation quanta having energies within the first specified energy range, and to develop second gating signals for electrical transducer pulses caused by radiation quanta having energies within the second specified energy ranges; and the circuitry for processing the second positional coordinate signals to develop centroid positional coordinate signals further comprising an integrator having an output; and a first switch responsive to the second gating signals and connected between the imaging device and the integrator for gating the second positional coordinate signals to the integrator, whereby the output of the integrator is a centroid displacement signal.

4. Motion correction circuitry as defined in claim 3, wherein the circuitry for processing the second positional coordinate signals to develop centroid positional coordinate signals further comprises a sample-and-hold circuit, a hold trigger for developing a hold signal, and a second switch connected between the output of the integrator and the sample-and-hold circuit, and responsive to the hold signal to disconnect the output of the integrator from the sample-and-hold circuit, whereby the output signal of the sample-and-hold circuit is an initial centroid positional coordinate signal.

5. Motion correction circuitry as defined in claim 4, wherein the circuitry for processing the centroid positional coordinate signals for correcting the first positional coordinate signals comprises a summer which is connected to sum the first positional coordinate signals, the integrator output signals and the sample-and-hold circuit output signals.

6. Motion correction circuitry, as defined in claim 3 or 5, further comprising circuitry responsive to the first gating signals to develop unblanking signals.

7. Motion correction circuitry as defined in claim 6, wherein the circuitry responsive to the first gating signals to develop unblanking signals comprises a retriggerable one-shot multivibrator.

8. Method for correcting the motion due to an object's movement in an radiation imaging system, comprising the steps of:

(a) producing first positional coordinate signals in response to quanta of radiation derived from a first radiation emitting substance associated with the object;

(b) producing second positional coordinate signals in response to quanta of radiation derived from a second radiation emitting substance associated with the object;

(c) processing the second positional coordinate signals to develop centroid positional coordinate signals corresponding to the mean position of a plurality of the second positional coordinate signals; and (d) using the centroid positional coordinate signals for correcting the first positional coordinate signals.

9. Method according to claim 8, wherein the object is a patient's body.

10. Method according to claim 9, producing first positional coordinate signals in response to quanta of radiation derived from a first radiation emitting substance ingested by the patient and producing second positional coordinate signals in response to quanta of radiation derived from a second radiation emitting substance attached on the surface of the patient's body.

11. Motion correction circuitry for correcting the motion due to an object's movement in an radiation imaging system, comprising:

(a) means for producing first positional coordinate signals in response to quanta of radiation derived from a first radiation emitting substance associated with the object;

(b) means for producing second positional coordinate signals in response to quanta of radiation derived from a second radiation emitting substance associated with the object;

(c) means for processing the second positional coordinate signals to develop centroid positional coordinate signals corresponding to the mean position of a plurality of the second positional coordinate signals; and (d) means for using the centroid positional coordinate signals for correcting the first positional coordinate signals.

12. A gamma scintillation camera including a motion correction circuit for correcting the motion due to patient's movement, said motion correction circuit comprises:

(a) a transducer for producing electrical pulses in response to quanta of radiation impinging on the transducer derived from a first radiation substance associated with the patient's body having energies within a first specified energy range and a second radiation substance associated with the patient's body having energies within a second specified energy range;

(b) circuitry for processing the electrical transducer pulses to develop (b1) first positional coordinate signals corresponding to quanta of radiation having energies within the first specified range; and (b2) second positional coordinate signals corresponding to the quanta of radiation having energies within the second specified range;

(c) circuitry for processing the second positional coordinate signals to develop centroid positional coordinate signals corresponding to the mean position of a plurality of the second positional coordinate signals; and (d) circuitry for processing the centroid positional coordinate signals for correcting the first positional coordinate signals.

* * * * *